United States Patent Office 3,563,701
Patented Feb. 16, 1971

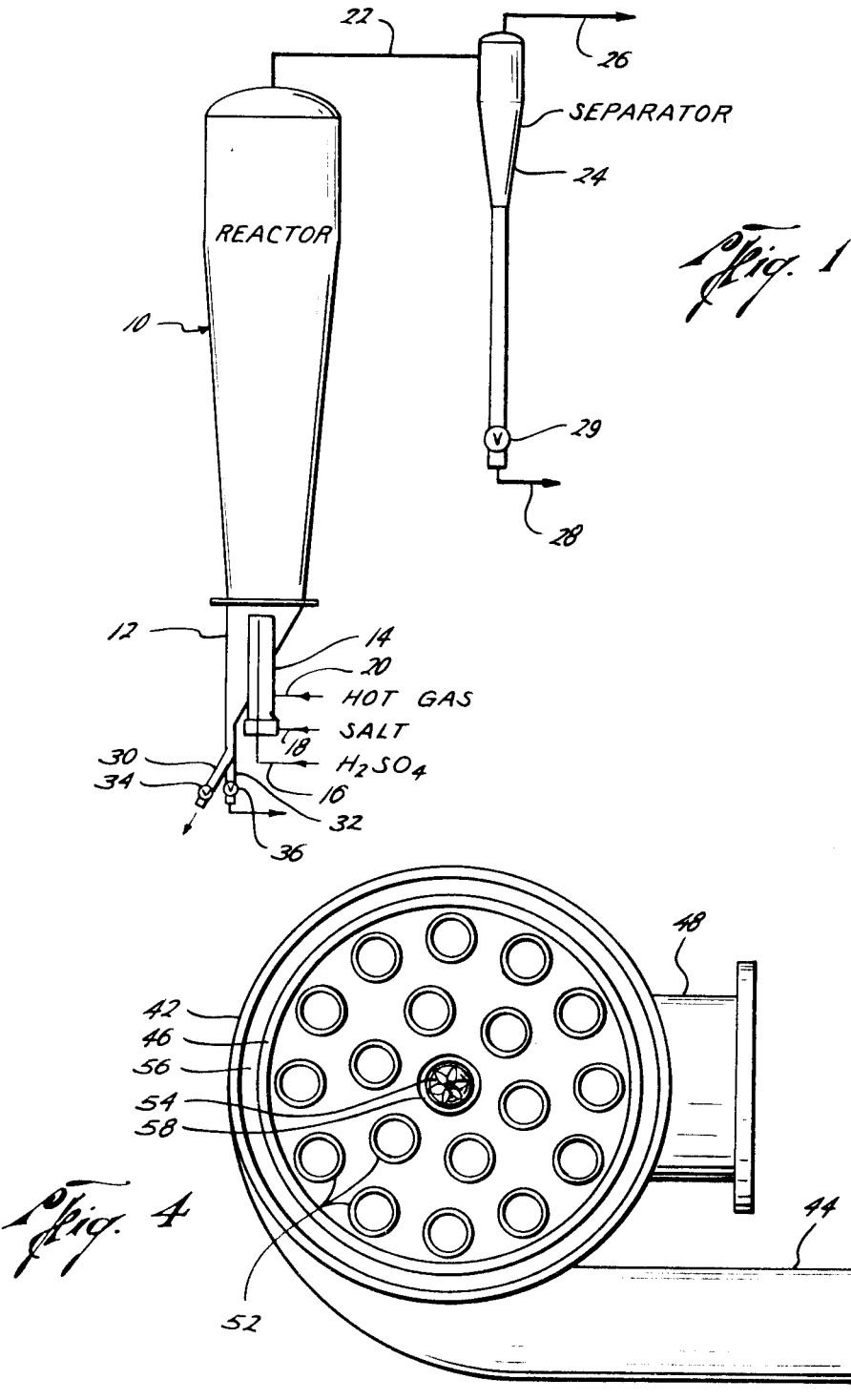

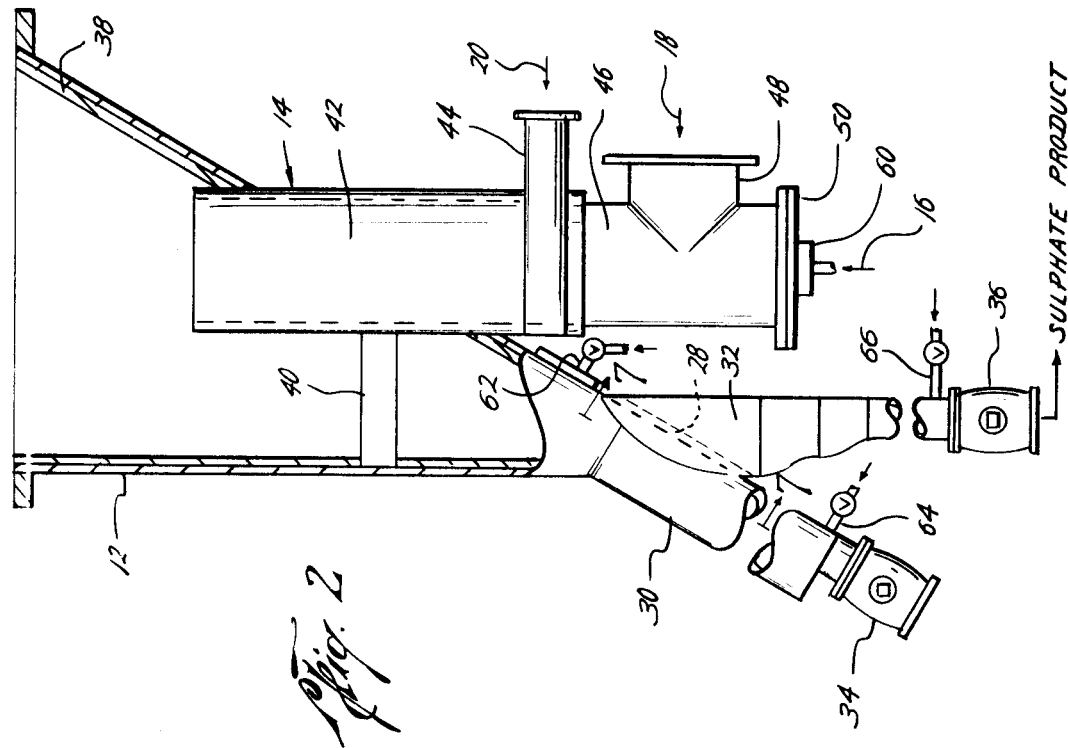
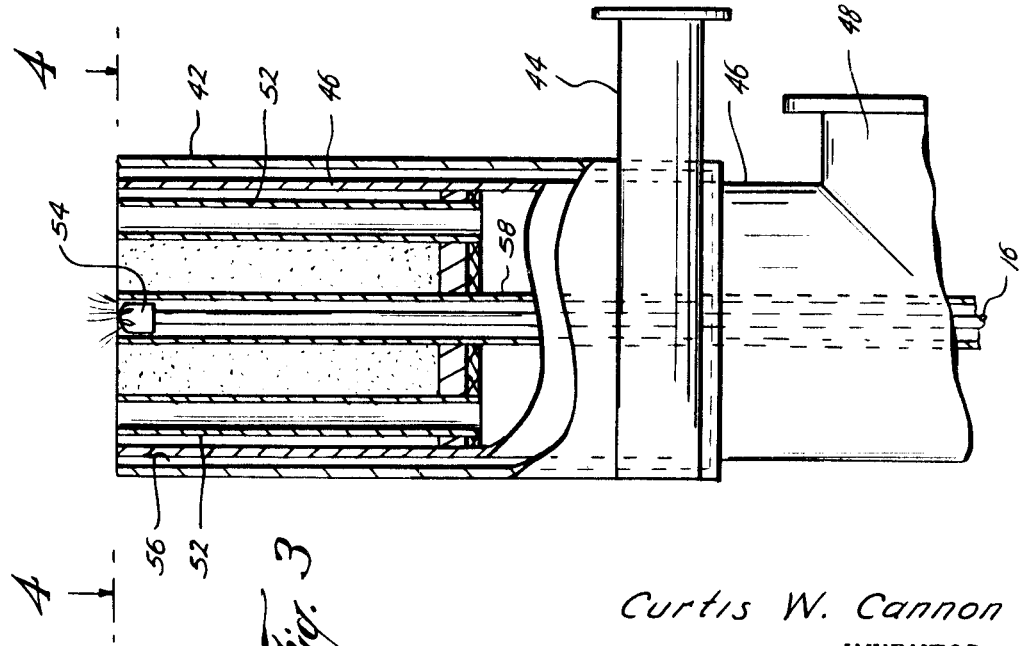

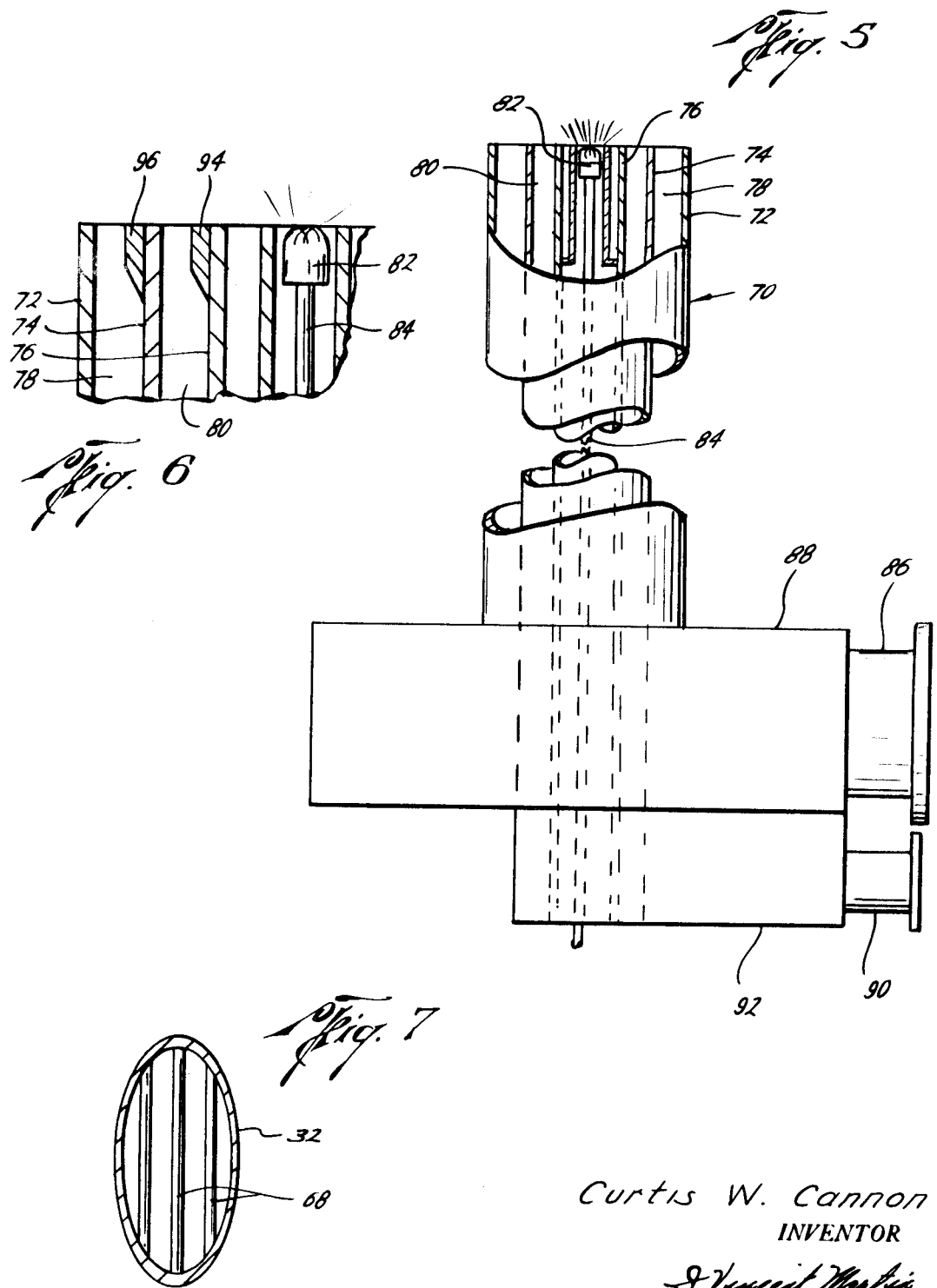

---

3,563,701
METHOD OF PRODUCING SULFATE GRANULES AND VOLATILE ACID GASES
Curtis W. Cannon, Boulder, Colo., assignor to Climax Chemical Company, Monument, N. Mex., a corporation of Delaware
Filed Feb. 28, 1967, Ser. No. 619,434
Int. Cl. C01d 5/02; C01g 1/10
U.S. Cl. 23—117                    15 Claims

ABSTRACT OF THE DISCLOSURE

A method of and apparatus for producing sulfate salts and a volatile acid gas by providing intimate contact between fluidized salt particles and a spray of sulfuric acid in a reaction zone maintained at elevated temperature.

This abstract is neither intended to define the invention of the application which, of course, is measured by the claims, nor is it intended to be limiting as to the scope of the invention in any way.

BACKGROUND OF THE INVENTION

The present invention relates to an improved method of and apparatus for producing sulfate salts and the volatile acid gas from sulfuric acid and the feed salt containing the more volatile acid radical. As used herein, the term sulfates shall mean those salts produced by reaction between sulfuric acid and the corresponding feed salt.

Prior to the present invention, several types of methods have been used for reacting sulfuric acid and salts such as sodium chloride. In one type, the sulfuric acid and the salt are reacted in a rotary furnace directly in contact with combustion gases to supply the necessary reaction temperature. Excessive lumping of the sulfate product occurs, and the hydrochloric gases are considerably diluted by the large amount of combustion gases necessary to maintain the reaction temperature. In another type, such reaction takes place in a muffle type furnace with rotary rakes. Such furnaces have structural limitations which restrict capacity of single units and produce a poorer grade of sulfate than the method to be described. In a further method, the reaction takes place in a granular bed maintained at reaction temperatures by hot combustion gases, containing sulfur trioxide or sulfuric acid vapors, to maintain the bed in a fluidized state and if sulfuric acid is used, this method requires the use of an acid vaporizing chamber. This third method produces a uniform powder-like sulfate of high quality but for some purposes, the sulfate is excessively dusty. It is preferred that it be in the form of coarser particles and granules having freer flowing characteristics.

It is therefore an object of the present invention to provide an improved method of and apparatus for producing a more granular and free-flowing sulfate product and a volatile acid gas from the reaction of sulfuric acid with a salt feed containing the more volatile acid radical.

Another object of the present invention is to provide an improved method of producing sulfates from sulfuric acid in a fluidized bed with a minimum production of fines.

Another object is to provide an improved method of and apparatus for producing sulfate granules from sulfuric acid in which the sulfate granules have a high density and are a free-flowing product which is easily handled.

Another object is to provide an improved method of commercially producing a sulfate product of very high purity.

A further object is to provide an improved method of reacting sulfuric acid and a fluidized salt feed at elevated temperatures in which losses of sulfuric acid due to decomposition at such temperatures in the vapor phase is substantially avoided.

A further object is to provide an improved apparatus for providing intimate contact of sulfuric acid with fluidized salt particles.

Still another object is to provide an improved method of and apparatus for producing a granular sulfate product in a fluidized bed reaction zone from sulfuric acid which eliminates the use of an acid vaporizing chamber.

Still a further object is to provide an improved method of and apparatus for producing sulfates from liquid sulfuric acid by which construction is simplified and maintenance of the equipment is minimized.

The present invention contemplates the production of a sulfate and a volatile acid gas from the reaction of sulfuric acid with a salt containing a more volatile acid radical. Examples of these salts are sodium chloride, potassium chloride, calcium fluoride and calcium phosphate. When reacted wtih sulfuric acid, these salts produce sulfates of sodium, potassium and calcium and the corresponding volatile hydrochloric, hydrofluoric and phosphoric acid gases. In the following description of the process only one salt, sodium chloride, is used; it being understood that such description is illustrative of the process using other suitable salts.

BRIEF DESCRIPTION OF THE DRAWINGS

These and other objects and advantages of the present invention are hereinafter set forth in the description of the forms of the invention shown in the drawings wherein:

FIG. 1 is a schematic flow diagram illustrating the preferred form of the present invention.

FIG. 2 is a detail elevation view of the lower end of the vessel defining the reaction zone and the preferred form of apparatus for introducing the feed components and heating medium into the reaction zone.

FIG. 3 is a partial sectional view of the feed apparatus shown in FIG. 2.

FIG. 4 is a plan view of the feed apparatus taken along line 4—4 in FIG. 3.

FIG. 5 is an elevation view partly in section of a modified form of feed apparatus.

FIG. 6 is a partial sectional view illustrating a further modification of the feed apparatus shown in FIG. 5.

FIG. 7 is a sectional view of the grate structure over the sulfate outlet taken along line 7—7 in FIG. 2.

Referring more in detail to FIG. 1, the reactor 10, which defines the reaction zone is provided with an eccentric conical bottom 12. The feed apparatus 14 extends through the bottom 12 into communication with the reaction zone and as hereinafter described in greater detail is adapted to supply a spray of liquid sulfuric acid, salt particles and heated gas to said reaction zone. Sulfuric acid is pumped through line 16 from a suitable source (not shown) to feed apparatus or sparger 14. Salt particles entrained in a gas stream are supplied through line 18 to feed apparatus 14. Hot gases are supplied through line 20 to the feed apparatus 14 from a suitable source (not shown) such as a furnace and blower.

To provide the desired reaction and to minimize the production of bisulfates and oversize agglomerates it is preferred that the temperature in the reaction zone be maintained in the range of 700° F. to 1000° F. To maintain such reaction temperatures, temperatures of the hot gases will be between 1600° and 2000° F. Hot air or gas used to feed the salt may have a temperature approaching the melting point of the feed salt, but care should be taken to assure that the salt particles are not heated to their softening point as they can fuse, block the salt passages, and form crusts which would interfere with the salt feed. If desired, the entrained salt particles and the hot gases may be combined immediately before their discharge from the feed apparatus 14 into the reaction zone. To obtain proper spraying of the acid with a conical type spray, it is believed that the acid should be under a pressure in the range of 200 p.s.i. to 500 p.s.i. The combined volume of gas being fed to the reaction zone is preferred to be sufficient to maintain the unreacted and partially reacted salt particles fluidized while allowing the sulfate granules to settle in the lower end of the reaction zone to be discharged therefrom. This gas sweeps the acid gas and the fines upwardly through the reaction zone and through line 22 into separator 24. Separator 24 is of any suitable design to remove the fine solids from the gases. The gases including the hydrochloric gas are discharged from separator 24 through line 26 and may be conducted to suitable equipment (not shown) for the recovery of the hydrochloric gas from the other gases. The solids separated from the gases in separator 24 are discharged therefrom through line 28 by discharge valve 29. These undersized sulfate particles may preferably return to the reaction zone for agglomeration by entrainment in the salt feed flowing through line 20. A portion of the hot product gases may be recycled and used to supply the gas for heat and fluidization so that sufficient gases for the transport and fluidization are available without unnecessary dilution of the product gases with excess air.

As hereinafter described, the sulfuric acid is supplied to the reaction zone as a liquid spray. However, it has been discovered that as much as sixty percent of the stoichiometric amount of sulfuric acid may be supplied to the reaction zone as vapors in the hot gas feed with the remainder of the acid being supplied as a liquid spray without sacrificing the advantages previously mentioned. This utilization of acid vapors is particularly advantageous when such vapors are available from a sulfuric acid plant converter. It will be appreciated that sulfuric acid plant converter gases are adequate in volume to maintain fluid or transport velocities in fluidized reactors and that the dilution of these gases with excess air, combustion products and inert gases from the air is sufficient. This same effective dilution can be obtained by introducing an excess of air, combustion gases or recycle product gases, even when all or part of the sulfuric acid is injected as a liquid. Utilization of such converter gases is economical since such gases are available in suitable concentration for use in the present process and are available at elevated temperatures. It has been found that the use of a substantial percentage of the sulfuric acid feed to the fluidized bed reaction zone as liquid will substantially produce the desired agglomeration of the particles into free-flowing granules.

The lower end of bottom 12 of reactor 10 connects with discharge lines 30 and 32. Suitable means is provided to separate the oversize sulfates to be discharged through line 30 under control of valve 34 while the sulfate granules are discharged from line 32 under control of valve 36.

It has been found that by spraying the liquid sulfuric acid into the fluidized salt in the reaction zone and by substantially surrounding the acid spray with the hot gas and/or salt feed streams in the reaction zone, the reaction may be carried essentially to completion in a single stage with 93 to 98 percent of stoichiometric yields. Additionally, the size of the sulfate granules is affected by adjustment of the spray position and the liquid acid pressure as well as by controlling the reaction zone temperatures and the recycle of fines to the reaction zone. This method results in the production of globular sulfate granules of higher density which have free-flowing characteristics and reduced tendency to cake as compared to the finer sulfate product produced by the vapor acid feed process.

This form of feeding of the liquid sulfuric acid to the reaction zone while providing a shield of hot gases and salt around the sulfuric acid spray, protects the walls of reactor 10 from direct contact with the unreacted acid, eliminates massive agglomeration and minimizes corrosion conditions in the reactor 10.

The feeding apparatus or sparger 14 and the eccentric cone bottom 12 of reactor 10 are shown in more detail in FIG. 2. The interior of the bottom 12 is provided with a suitable lining 38. The sparger 14 is supported in position extending through the bottom 12 approximately on the center line of reactor 10 by the support 40. The only significant corrosion occurring is in the vicinity of the initial reaction products and this is minimized by design of the sparger which jets the reaction products into the bed. Thus, no lining is required above the bottom ten to fifteen feet of the reactor and such lining as is used may be a simple acid-proof mortar.

The sparger 14 illustrated in FIGS. 2, 3 and 4 includes an outer shell 42 having a volute inlet 44; an inner shell 46 extending below the outer shell 42, having an inlet 48 and a lower closure 50 through which the acid gas inlet 16 extends; a plurality of tubes 52 set in suitable heat resistant mortar; and the spray nozzle 54 which is adapted to spray the liquid sulfuric acid into the reaction zone as a conical spray immediately above the upper ends of shells 42 and 46 and tubes 52. The lower end of outer shell 42 is suitably sealed as by welding to the exterior of inner shell 46 to direct the flow of the gas and entrained salt particles upwardly through the annular space 56 defined between shells 42 and 46. The volute inlet 44 causes the gas and entrained salt particles to be discharged with a swirling motion which assists in the mixing of the acid spray and the fluidized particles in the reaction zone. It also avoids direct impingement of the salt feed which impingement may result in caking of the salt on the inner shell 46. The tubes 52 provide communication to direct the flow of hot gases delivered into the inner shell 46 by the inlet 48 into the reaction zone. The tubular member 58 surrounds the nozzle 54 and extends downwardly around line 16 to provide a passage for the insertion of the acid nozzle. A means is provided to adjust the position of nozzle 54 vertically with respect to the tubular member 58. Such means may include the packing gland 60 secured to closure 50 and adapted to tightly seal against and support line 16.

Since some fines which may include unreacted salt particles or small sulfate particles may gravitate into the lower end of the bottom 12 and into the discharge lines 30 and 32, the purge lines 62, 64 and 66 with suitable flow controls are connected to the bottom 12 and lines 30 and 32, respectively, to elutriate and circulate the fines back into the reaction zone.

As previously mentioned, it is desired to avoid discharging the occasional oversize sulfate agglomerates with the sulfate granule product and means such as the grating 68 is provided to separate such oversize sulfates from the product. The grating 68, as shown in FIG. 7, is a series of parallel bars positioned in the juncture between outlets 30 and 32. For example, in outlets of eight inch pipe, the grating bars include three, one-half by two inch bars spaced equally over the juncture area. In this manner, the oversize sulfate agglomerates and other large materials which might block the discharge line 32 or its valve 34 are prevented from entering the discharge line 32. The valve 34, a full opening valve, is opened momentarily every few hours to discharge the oversize sulfates from line 32. The valve 36 controlling discharge of the sulfate granule product may be a star feeder valve to remove the product without disturbing the reaction in reactor 10.

The modified form of feeding apparatus of sparger 70 illustrated in FIG. 5 includes an outer shell 72, an intermediate shell 74 and an inner shell 76 positioned in concentric relationship to each other to provide an outer annular hot gas passage 78, an inner annular salt passage 80 and to surround the nozzle 82 and its feed line 84.

A suitable ceramic or other refractory material surrounds the nozzle 82 at the upper end of the feed line 84. Hot air is fed into the passage 78 by the inlet 86 and the volute chamber 88 connecting from inlet 86 to annular hot gas passage 78. Gas with salt entrained therein is conducted through inlet 90 and volute chamber 92 to the salt passage 80. The two volute chambers 88 and 92 provide the means to impart a rotational movement to the hot gases and the entrained salt feed when discharged into the reaction zone in surrounding relation to the acid spray from nozzle 82.

The sparger 70 may be further modified as shown in FIG. 6 to provide an increase in the velocity of both the hot gas feed and the salt feed streams into the reaction zone. To accomplish this, the rings 94 and 96 are secured as by welding to the outer periphery of shells 76 and 74 at their upper ends. As shown, the rings change the flow area of the outlets of passages 78 and 80. By so restricting these passages at their outlets, the velocities of gases flowing therethrough are correspondingly increased. Gas velocities through said restricted outlets may be in excess of 100 feet per second.

Velocity of the gases flowing upward through the reactor 10 is preferably maintained in the range of 1 to 5 feet per second at the full diameter of reactor 10. Sufficient hot air is introduced to maintain the preferred temperature in the reaction zone and to sustain the fluid bed action, i.e., fluidizing substantially all particles smaller than the desired sulfate granule product.

In operation, stoichiometric proportions of sulfuric acid and salt feeds are introduced into the reaction zone together with the hot gases. As mentioned, the liquid sulfuric acid is sprayed in a conical spray at pressures to provide atomization of the acid into the fluidized particles.

In the reaction zone, it can be explained that the acid contacts the salt particles and the reaction (in the case of sodium chloride) produces sodium sulfate and hydrochloric gas. When the acid initially contacts the particle of salt or sulfate briefly due to the local excess of unreacted acid, the outside of the particle becomes plastic and sticky, whereby particles have a tendency to agglomerate into large granules. Within a few seconds, usually several seconds, the reaction goes to completion to form non-agglomerating sulfate granules and no further agglomeration occurs.

During these sticky stages, the product is very corrosive to metals and tends to accumulate on the vessel ports, but by shielding with hot gases and for unreacted salt the liquid acid makes its initial contact with the salt directly in the bed so that these undesirable effects are substantially avoided.

The agglomerated sulfate granules are sufficiently heavy to settle in the fluidized bed and be discharged from the reactor 10. The fine salt and sulfate particles rise through the reactor and are discharged therefrom into the separator 24 with the hot gases and the hydrochloric gas. Since these fine particles of salt and sulfate are readily separated from the gases, they may be returned or recycled to the reaction zone with the salt feed where they are agglomerated with newly formed sulfate particles into sulfate granules.

With the present invention, it has been found that a sulfate granule product of extremely high purity may be obtained simply by screening the sulfate product. The agglomerated plus 50 of the screenings has been found to be as high as from 99.0 to 99.8 percent purity where the finer product averages 95 to 97 percent purity. It has been found in analyzing the screened product that the larger or plus 50 product has the highest purity; the screenings between minus 50 to plus 200 appear to gradually reduce in concentration with the reduction in size but the —200 product gradually increases in purity again. It is believed that the smaller particles of higher purity result from the abrasion of the sulfate forming on the outer shell initially formed around the particles in the reaction zone. Further exposure of these sulfate fines to liquid sulfuric acid in the reaction zone results in the formation of polysulfates that are sticky or liquid and thereby facilitates the agglomeration. These pure sulfate granules are believed to be the agglomeration of these particles. The intermediate size less pure sulfate product is believed to be small amounts of incompletely reacted salt surrounded by a sulfate shell. The recycling of the fines into the reaction zone and their subsequent agglomeration into the larger granules in the sulfate product is responsible for the yield of high purity larger sulfate granules.

From the foregoing it can be seen that the present invention provides an improved method of and apparatus for reacting a salt and sulfuric acid to produce a free-flowing sulfate granule product of high purity and a volatile acid gas. The method and apparatus allows the reaction to be controlled to produce the desired size granules of sulfate and also to minimize production of fines and oversize sulfates. The present invention further minimizes exposure of the apparatus to highly corrosive initially formed reaction products by the particular design of the feed apparatus or sparger which surrounds the atomized sulfuric acid spray with the upwardly flowing hot gases and salt feed.

The foregoing disclosure and description of the invention are illustrative and explanatory thereof, and various changes in the size, shape and materials, as well as in the details of the illustrated construction, may be made within the scope of the appended claims without departing from the spirit of the invention.

What is claimed is:

1. The method of producing sulfate granules and a volatile acid gas comprising,
   feeding particles of a salt selected from the group consisting of sodium chloride, potassium chloride, calcium fluoride, and calcium phosphate into a reaction zone,
   maintaining temperature in said reaction zone between 700–1000° F.,
   maintaining said salt particles in a fluidized state in said reaction zone,
   spraying liquid sulfuric acid into said fluidized salt particles in said reaction zone, whereby said sulfuric acid initially reacts with said salt particles to form a volatile acid gas and to also form sulfate particles having a sticky outer surface whereby several particles may agglomerate into a granule,
   permitting the reaction to go to completion responsive to the temperature in said reaction zone to form non-agglomerating sulfate granules,
   discharging said non-agglomerating sulfate granules from said reaction zone, and
   discharging the volatile acid gas from said reaction zone.

2. The method according to claim 1 wherein the maintenance of temperature and the maintenance of said salt particles in a fluidized state is carried out by
   feeding gas at a controlled temperature and controlled volume into said reaction zone.

3. The method according to claim 2, including
   feeding a portion of the sulfuric acid for the reaction to said reaction zone as a vapor in the hot gas fed to said reaction zone.

4. The method according to claim 2, including
   feeding a substantial portion of the sulfuric acid for the reaction to said reaction zone as vapor in the hot gas fed to said reaction zone.

5. The method according to claim 1, wherein
   said salt particles are fed to said reaction zone entrained in a gaseous stream.

6. The method according to claim 1, wherein
   said salt particles are fed entrained in a gaseous stream and discharged into said reaction zone in surrounding relation to the sulfuric acid spray.

7. The method according to claim 2, wherein said hot gas is fed into said reaction zone in surrounding relation to said sulfuric acid spray.

8. The method according to claim 2, wherein said salt particles and said hot gas are fed into said reaction zone in surrounding relation to said sulfuric acid spray.

9. The method according to claim 1, including discharging fine particles from said reaction zone with said volatile acid gas and other gases,
separating said fine particles from said gasses, and
recycling said separated fine particles into said reaction zone.

10. The method according to claim 1, including introducing purge gas into said sulfate granules before their discharge from said reaction zone whereby salt and sulfate particles are elutriated and circulated back to said reaction zone.

11. The method according to claim 2, including recycling said hot gases to said reaction zone.

12. The method according to claim 1, including adjusting the sulfuric acid spray to produce sulfate granules of the desired size.

13. The method according to claim 1 including the step of,
separating the larger, high purity sulfate granules from the remainder of said discharged sulfate granules to provide a high purity sulfate product.

14. The method according to claim 1, wherein said sulfuric acid and said salt particles are introduced into said reaction zone in stoichiometric quantities.

15. The method of producing sulfate granules and a volatile acid gas including the steps of
feeding particles of a salt selected from the group consisting of sodium chloride, potassium chloride, calcium fluoride and calcium phosphate into a reaction zone,
feeding hot gas into said reaction zone in sufficient volume to maintain salt particles in a fluidized state in said reaction zone and a temperature in said reaction zone between 700–1,000° F.,
spraying liquid sulfuric acid into the fluidized salt particles in said reaction zone whereby a volatile acid gas and sulfate granules are formed,
discharging sulfate granules from the reaction zone, and
discharging the volatile acid gas from said reaction zone.

References Cited
UNITED STATES PATENTS

| | | | |
|---|---|---|---|
| 2,706,144 | 4/1955 | Cannon | 23—121 |
| 2,706,145 | 4/1955 | Cannon | 23—121 |
| 3,102,787 | 9/1963 | McMillan et al. | 23—153 |

EARL C. THOMAS, Primary Examiner

U.S. Cl. X.R.

23—121, 122, 153, 154, 165